(12) United States Patent
Molisch et al.

(10) Patent No.: US 7,486,720 B2
(45) Date of Patent: Feb. 3, 2009

(54) TRAINING FRAMES FOR MIMO STATIONS

(75) Inventors: Andreas F. Molisch, Arlington, MA (US); Jianxuan Du, Belmont, MA (US); Daqing Gu, Burlington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 465 days.

(21) Appl. No.: 11/127,006

(22) Filed: May 11, 2005

(65) Prior Publication Data

US 2006/0274847 A1 Dec. 7, 2006

(51) Int. Cl.
*H04B 1/38* (2006.01)
*H04B 7/02* (2006.01)
*H04L 27/00* (2006.01)

(52) U.S. Cl. .................. 375/219; 375/267; 375/299; 375/347; 455/25; 455/101; 455/562.1

(58) Field of Classification Search ......... 370/208, 370/234, 334, 435, 437, 465; 375/219, 147–148, 375/267, 299, 347; 455/25, 101, 562.1
See application file for complete search history.

(56) References Cited

U.S. PATENT DOCUMENTS

| | | | |
|---|---|---|---|
| 7,327,983 B2 * | 2/2008 | Mehta et al. | 455/63.1 |
| 7,336,727 B2 * | 2/2008 | Mukkavilli et al. | 375/299 |
| 7,366,245 B2 * | 4/2008 | Li et al. | 375/260 |
| 7,369,511 B2 * | 5/2008 | Utsunomiya et al. | 370/252 |
| 2004/0131011 A1 * | 7/2004 | Sandell et al. | 370/210 |
| 2005/0003863 A1 * | 1/2005 | Gorokhov | 455/562.1 |
| 2005/0152387 A1 * | 7/2005 | Utsunomiya et al. | 370/431 |
| 2006/0171482 A1 * | 8/2006 | Trachewsky | 375/267 |
| 2006/0270343 A1 * | 11/2006 | Cha et al. | 455/25 |

FOREIGN PATENT DOCUMENTS

EP 1414177 A 4/2004

OTHER PUBLICATIONS

Gorokhov et. al., "Transmit/Receive MIMO antenna subset selection", IEEE 2004.*

(Continued)

*Primary Examiner*—Mohammad H Ghayour
*Assistant Examiner*—Sophia Vlahos
(74) *Attorney, Agent, or Firm*—Drink Brinkman; Gene Vinokur

(57) ABSTRACT

A method transmits training frames in a MIMO system. A long sequence of training frames is transmitted from a station B to a station A via a channel of the MIMO system, in which the station A includes $N_A$ antennas and $N_{A\_SS}$ RF chains and the station B includes $N_B$ antennas and $N_{B\_SS}$ RF chains, and a number of frames in the long sequence of training frames is at least equal to $$\lfloor N_B \cdot N_A / N_{A\_SS} \rfloor,$$

where $$\lfloor \rfloor$$

is a lower bound operator. A short sequence of training frames is transmitted from the station A to the station B via the channel in response to receiving the long sequence of training frames. A number of frames in the short training sequence is at least equal to $$\lfloor N_{A\_SS} \cdot N_B / N_{B\_SS} \rfloor.$$

10 Claims, 3 Drawing Sheets

OTHER PUBLICATIONS

Paulraj et al. "MIMO Antenna Subset Selection with Space-Time Coding", IEEE Oct. 2002.*

E. Telatar, "Capacity of multi-antenna Gaussian channels," *European Tansactions on Telecommunications*, vol. 10, p. 585-595, Nov.-Dec. 1999.

G. J. Foschini and M. J. Gans, "On the limits of wireless communications in a fading environment when using multiple antennas," *Wireless Personal Commun.*, vol. 6, pp. 315-335, Mar. 1998.

Sudarshan, P.; Mehta, N.B.; Molisch, A.F.; Zhang, J., "Spatial Multiplexing and Channel Statistics-Based RF Pre-Processing for Anetenna Selection", *Globecom*, Nov. 2004.

Molisch, A.F.; Zhang, X., "FFT-Based Hybrid Antenna Selection Schemes for Spatially Correlated MIMO Channels", *IEEE Communication Letters*, ISSN: 1089-7798, vol. 8, Issue 1, pp. 36-38, Jan. 2004.

Zhang, X.; Molisch, A.F.; Kung, S-Y, "Phase-Shift-Based Antenna Selection for MIMO Channels", *IEEE Global Telecommunications Conference (GLOBECOM)*, vol. 2, pp. 1089-1093, Dec. 2003.

Molisch, A.F.; Win, M.Z., "MIMO Systems with Antenna Selection", *IEEE Microwave Magazine*, ISSN: 1527-3342, vol. 5, Issue 1, pp. 46-56, Mar. 2004.

Gorokhov et al. "Transmit/receive MIMO antenna subset selection," May 17, 2004.

Milisch et al. "MIMO systems with antenna selection," Mar. 2003.

Barriac et al. "Antenna selection for space-time communication with covariance feedback," Nov. 11, 2004.

* cited by examiner

100

TRAINING FRAMES FOR MIMO STATIONS

FIELD OF THE INVENTION

The invention relates generally to multiple-input multiple-output (MIMO) communication systems, and more particularly to generating training frames for MIMO systems.

BACKGROUND OF THE INVENTION

It is well known that using multiple-input multiple-output (MIMO) techniques in a wireless communication system significantly increases capacity in a multipath environment. However, multiple antennas increase complexity and cost because each transmit antenna and each receive antenna requires a separate radio-frequency (RF) chain including a modulator and/ or demodulator, AD/DA converter, up/down converter, and a power amplifier.

Antenna and/or beam selection can reduce the number of RF chains, while still taking advantage of the capacity and diversity increase provided by multiple antennas and/or beams. With antenna selection, each input/output RF chain is associated with one selected antenna. Antenna selection depends on small-scale fading, which varies with frequency. Therefore, an antenna selected for one frequency is usually not appropriate for some other frequency when the two frequencies are separated by more than one coherence bandwidth.

Beam selection depends on the path angles of arrival, which are approximately the same for the entire frequency band of interest. Beam selection associates each input/output RF chain with a selected beam, which can be formed by a linear transformation of the signal vector including the received/transmitted signals at all antennas.

In antenna and/or beam selection, typically, a channel sub-matrix is selected from a complete channel matrix, or a transformed channel matrix for beam selection, according to some criterion. To implement antenna and beam selection, the channel matrix is estimated by sending training frames that enable the two stations to estimate characteristics of the channel completely.

In the case both the stations have the selection capability, by reciprocity of the channel, the estimated channel should be the same in both directions, and both stations can select the same submatrix independently, without an explicit exchange of selection results. Then, the selected submatrix can be used for coherent detection of transmitted data frames.

However, because of channel ambiguity caused by estimation error or channel variation caused by time difference between training frames in different directions, the observed channel is different when a station is operating in transmit mode or receive mode, and the independent antenna selection can cause the two stations to select different submatrices. If different submatrices are used by the two stations, then the performance of the system can be degraded severely.

To solve this problem, explicit signaling can be used to exchange the information about the selection in either the physical (PHY) layer or the media access layer (MAC) layer of the stations. However, the additional signaling information in the physical (PHY) layer or signaling delay in the MAC layer is undesirable due to practical limitations.

SUMMARY OF THE INVENTION

The invention provides a method and system to transmit training frames in a MIMO system.

A long sequence of training frames is transmitted from a station B to a station A via a channel of the MIMO system in which the station A includes $N_A$ antennas and $N_{A\_SS}$ RF chains and the station B includes $N_B$ antennas and $N_{B\_SS}$ RF chains.

A number of frames in the long sequence of training frames is at least equal to $$\lfloor N_B \cdot N_A / N_{A\_SS} \rfloor,$$

where $$\lfloor \ \rfloor$$

is a lower bound operation, i.e., a smallest integer larger or equal to $(N_B \cdot N_A / N_{A\_SS})$.

A short sequence of training frames is transmitted from the station A to the station B via the channel in response to receiving the long sequence of training frames. A number of frames in the short training sequence is at least equal $$\lfloor N_{A\_SS} \cdot N_B / N_{B\_SS} \rfloor.$$

DETAILED DESCRIPTION OF THE PREFERRED EMBODIMENT

Figure 1:
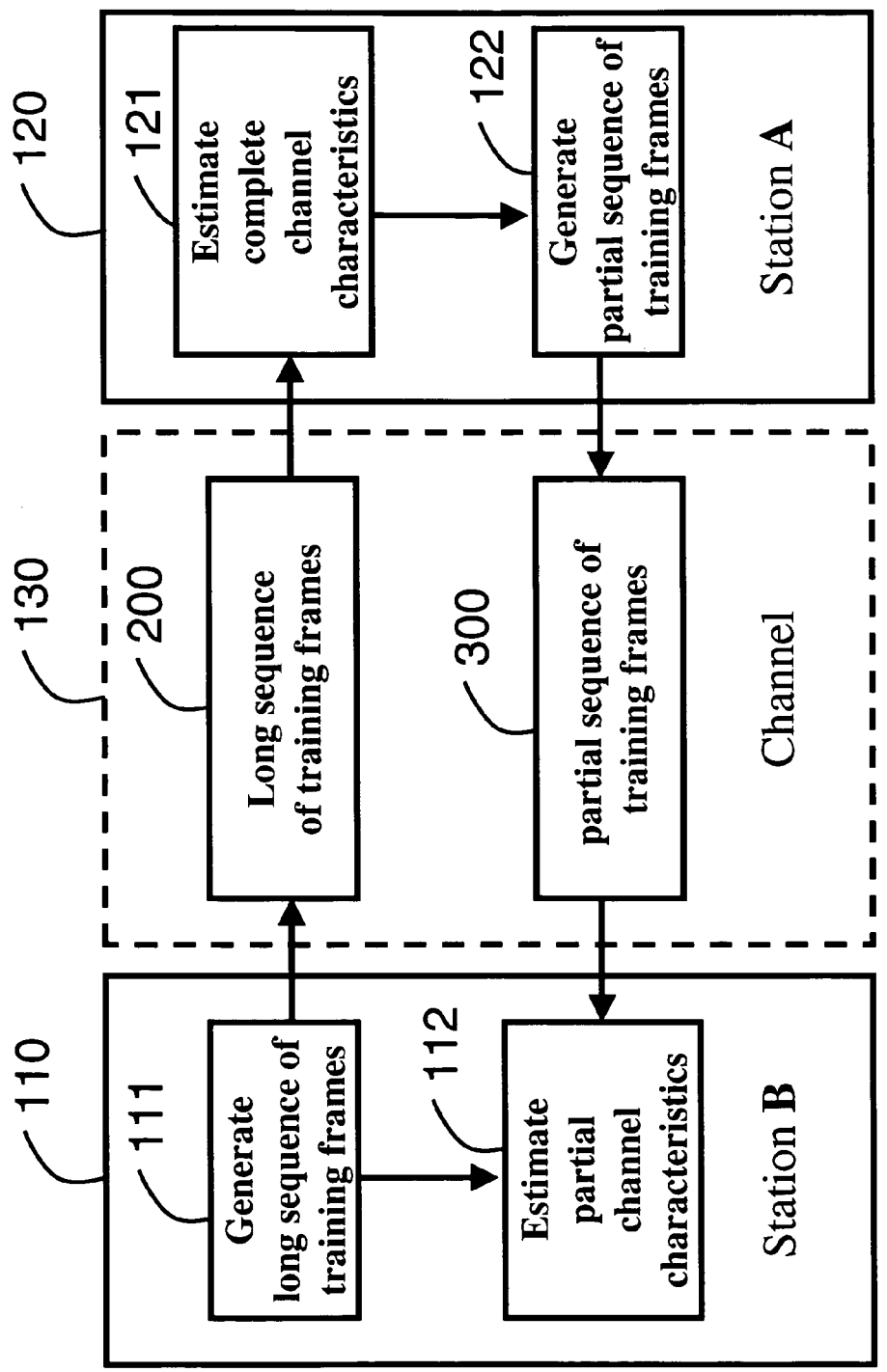
FIG. 1 is a block diagram of a MIMO system according to one embodiment of the invention.

As shown in FIG. 1, a MIMO system 100 includes a station B 110 and a station A 120 connected by a wireless channel 130. Station A includes $N_A$ antennas, and $N_{A\_SS}$ RF chains, and station B includes $N_B$ antennas, and $N_{B\_SS}$ RF chains 250, as known in the art, See FIG. 2-3. Typically, $N_A > N_{A\_SS}$, and $N_B > N_{B\_SS}$, for example $N_A = N_B = 4$, and $N_{A\_SS} = N_{B\_SS} = 2$, as shown in the Figures. Switching means 251 are also provided to connect the RF chains to the appropriate antennas, as known in the art.

This switching process is commonly referred to as antenna or beam selection 251. The parameters $N_A = N_B$ and $N_{A\_SS} = N_{B\_SS}$ can be communicated in either the media access layer (MAC), or in a preamble in the physical (PHY) layer, or the parameters are predetermined.

Figure 2:
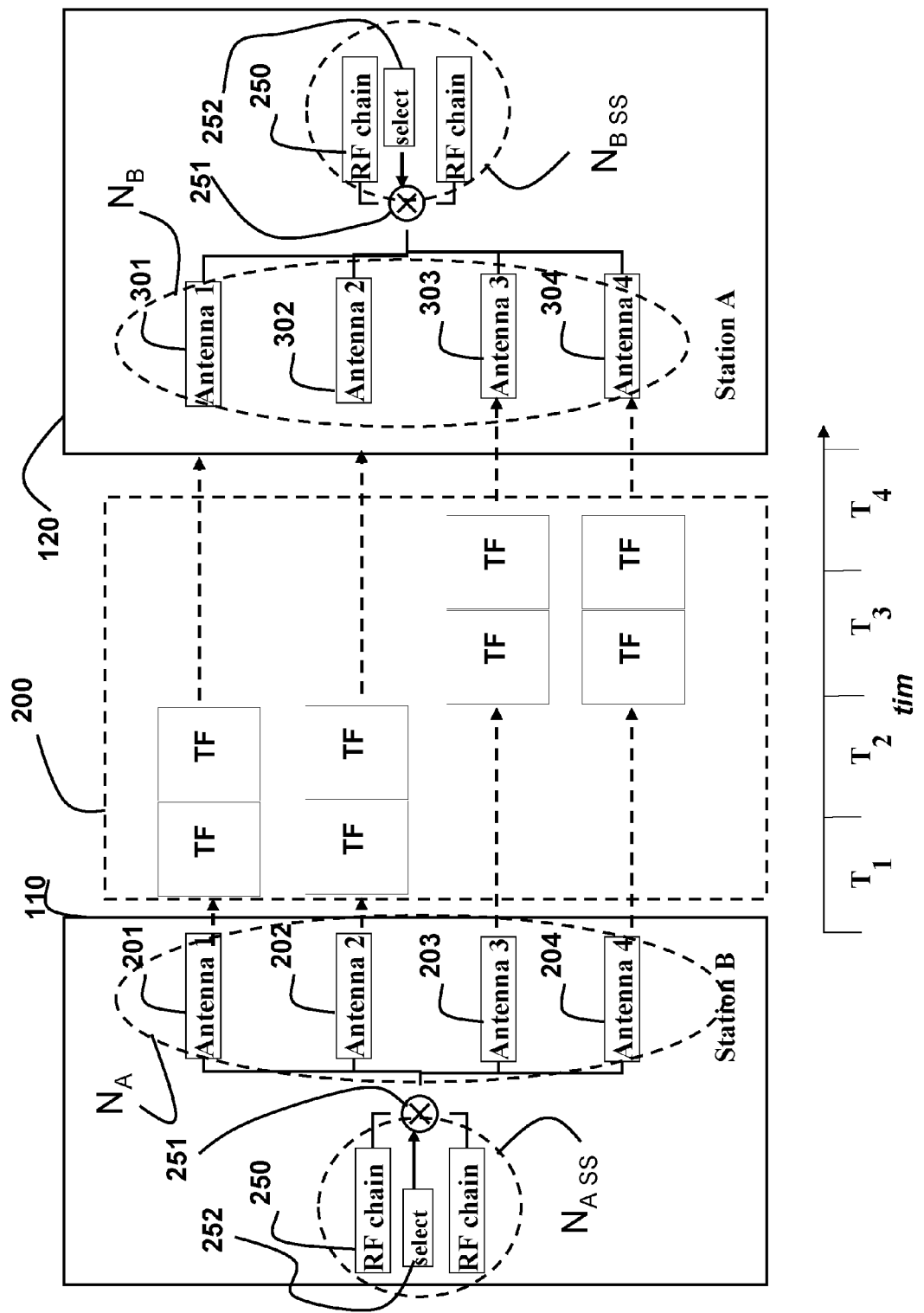
FIG. 2 is a block diagram of a long sequence of training frames generated by a first station B.

The station B, operating in a transmit mode, generates 111 a long sequence of training frames (TF) 200, see FIG. 2. A number of frames in the long sequence is at least equal to $$\lfloor N_B \cdot N_A / N_{A\_SS} \rfloor,$$

where $$\lfloor \rfloor$$

denotes a lower bound, i.e., a smallest integer larger or equal to $(N_B \cdot N_A/N_{A\_SS})$. Typically, the long sequence of training frames is generated in response to receiving a "request for full training" from station A, in station B.

Therefore, as defined herein, the long sequence of training frames includes at least one training frame for each of the transmit antennas 201-204 and each of the receive antennas 301-304 as shown in FIG. 2.

The long sequence of training frames 200 are transmitted to the station A operating in receive mode via the channel 130. The station A estimates 121 complete characteristics of the channel 130 from the long sequence of training frames. The complete channel characteristics can be used to select a subset of available antennas or beams in the station A. The subset has fewer members than the total number of available antennas or beams. For example, antennas 301-302 are selected. Typically, the size of the subset is $N_{B\_SS}$.

Figure 3:
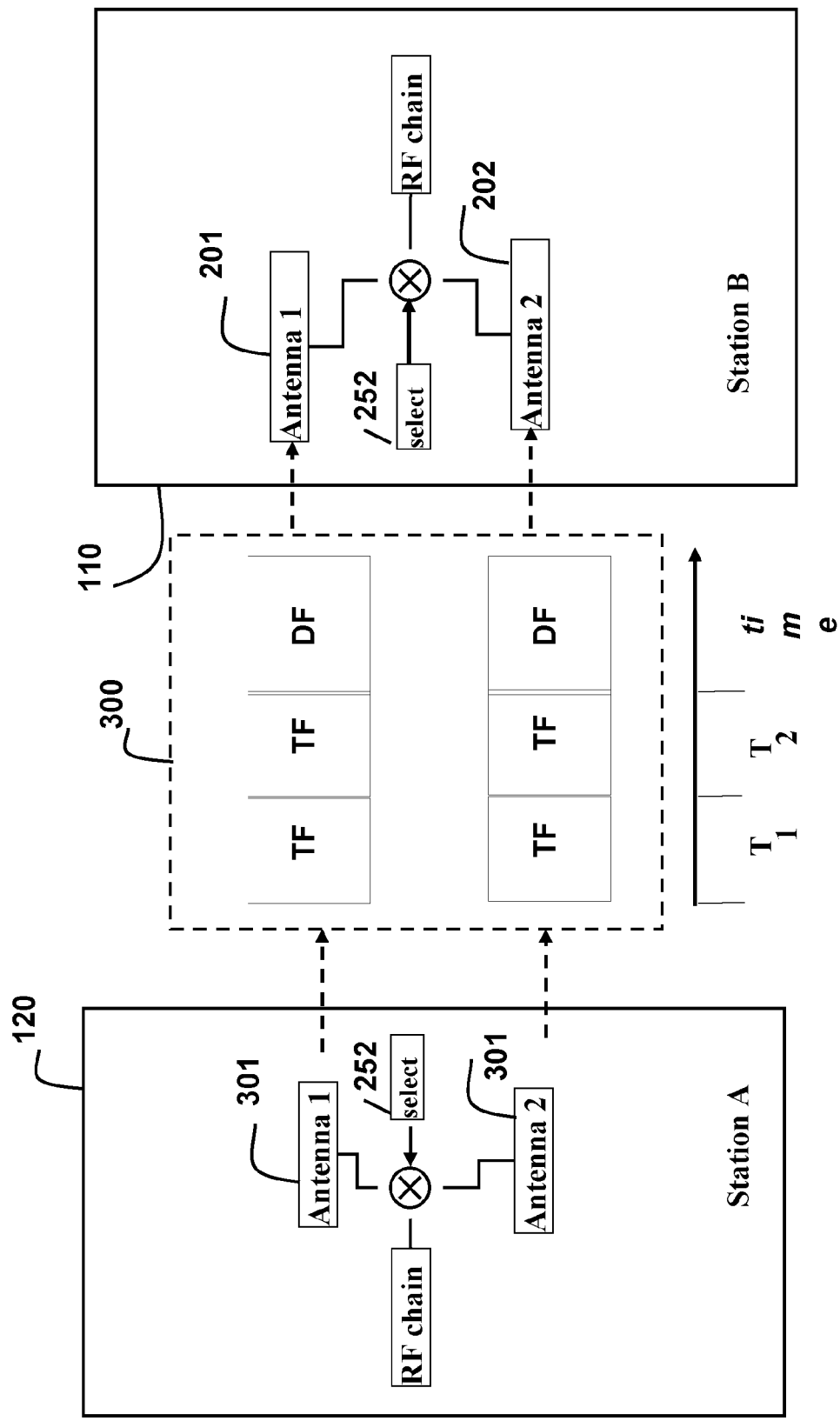
FIG. 3 is a block diagram of a partial sequence of training frames generated by a second station B.

According to the complete channel characteristics, the station A, operating in the transmit mode, generates 122 a short sequence of training frames 300, see FIG. 3. As defined herein, a number of frames in the short sequence is at least equal to $$\lfloor N_{A\_SS} \cdot N_B/N_{B\_SS} \rfloor.$$

The short training frames 300 are transmitted to the station B operating in the receive mode via the channel 130 via the selected antennas. The station B estimates 112 partial characteristics of the channel from the short sequence of training frames. The partial channel characteristics can be used to select a subset of antennas or beams in the station B. This subset has fewer members than the number of available antennas, e.g., antennas 201-202, see FIG. 3.

The estimated channel characteristics and the selected antennas or beams can be used subsequently to transmit data frames (DT) from the station A, operating in transmit mode, 120 to the station B 110, operating in receive mode, via the channel 130 and vice versa.

Model for MIMO Systems

In a flat-fading MIMO system with $N_A$ antennas at the station A 120 and $N_B$ antennas at the station B 110, a relationship between transmitted and received signals can be expressed as:

$$r_B = F_B^H (H_{A \to B} F_A s_A + n),$$

where $r_B$ is a $N_{B\_SS} \times 1$ received signal vector, $s_A$ is a $N_{A\_SS} \times 1$ transmitted signal vector, and a matrix $H_{A \to B}$ is a $N_B \times N_A$ representing characteristics of the channel. A $N_B \times 1$ noise vector n has entries being independent and identically distributed (i.i.d.) zero-mean symmetric complex Gaussian random variables with variance $N_0$.

A matrix $F_A$ is a $N_A \times N_{A\_SS}$ transmit selection matrix, and a matrix $F_B$ is a $N_B \times N_{B\_SS}$ receive selection matrix. The selection matrices are submatrices of an identity matrix for antenna selection. In the case of beam-selection, the matrices include columns of a unitary matrix.

An equivalent channel matrix after antenna or beam selection is a $N_{B\_SS} \times N_{A\_SS}$ matrix $H_{eq} = F_B^H H_{A \to B} F_A$, which is a submatrix of the channel matrix $H_{A \to B}$, or a submatrix of the transformed channel matrix for beam selection. The determination of $F_A$ and $F_B$ is typically to optimize channel capacity or a signal-to-noise ratio (SNR).

Antenna Selection

For antenna selection, the selection is simply done by switching an output signal from an RF modulator chain to the selected transmit antenna, or the input signal from the selected receive antenna to an RF demodulator chain.

Beam Selection

For beam selection, the transformation can be implemented in the RF domain using some or all of the following components: a Butler matrix, phase-shifters, attenuators/amplifiers, and linear combiners and switches, and a following switching circuit. Alternatively, transformation and selection can be done jointly, again employing phase-shifters, attenuators/amplifiers, and linear combiners. In both cases, the required number of RF chains to modulate/demodulate the transmitted/received signals is less than the total available number of transmit and receive antennas, and the complexity and cost of the system is reduced.

Training Frames

The station A 120 estimates a complete channel matrix $H_{A \to B}$ representing the complete channel characteristics, from station A to station B, to determine the selection matrix $F_A$. This is achieved by transmitting the long sequence of training frames 111 from the station B to the station A. According to a reciprocity of the channel 130, the estimated channel matrix $H_{B \to A}$, from the station B to the station A, at the station A 120 is a transpose of the matrix $H_{A \to B}$, i.e., $H_{B \to A} = H_{A \to B}^T$.

A similar process can be performed by the station B 110 using the short sequence of training frames. Note that the determination of selection matrices $F_A$ and $F_B$ is done independently at both stations based on their estimated channel matrices. The selected antennas or beams can be different at the two stations because of channel estimation errors or channel variations in the different directions. This discrepancy can sometimes cause severe performance degradation.

For an example MIMO system, let both stations A and B operate according to a "two-out-of-four" antenna selection policy. The estimated channel at the station A 120 is $$\hat{H}_{A \to B} = \begin{bmatrix} 1 & 0 & 0 & 0 \\ 0 & 1 & 0 & 0 \\ 0 & 0 & 0.9 & 0 \\ 0 & 0 & 0 & 0.9 \end{bmatrix},$$

and the selected transmit/receive antennas at station A 120 are {1,2} and {1,2}, respectively, so that a desired equivalent channel is $$H_{eq} = \begin{bmatrix} 1 & 0 \\ 0 & 1 \end{bmatrix}.$$

At the station B, the estimated channel matrix is $$\hat{H}'_{A \to B} = \begin{bmatrix} 1 & 0 & 0 & 0 \\ 0 & 1 & 0 & 0 \\ 0 & 0 & 1.1 & 0 \\ 0 & 0 & 0 & 1.1 \end{bmatrix},$$

due to some channel ambiguity. Thus, the selected transmit/receive antennas at the station B are {3,4} and {3,4}, respectively, so that the desired equivalent channel is $$H'_{eq} = \begin{bmatrix} 1.1 & 0 \\ 0 & 1.1 \end{bmatrix}.$$

Without some exchange of information regarding the selected antennas at both stations, station A uses transmit antennas {1,2}, while station B uses receive antennas {3,4}, and the resultant channel matrix is $$H''_{eq} = \begin{bmatrix} 0 & 0 \\ 0 & 0 \end{bmatrix}.$$

In the prior art, this problem is solved by providing some information exchange mechanism in either the PHY layer or the MAC layer so that both stations use the same set of selected antennas.

However, for the PHY layer, the addition of a field in the preamble of each frame for this purpose is undesirable because this field is only used in the training frames during the selection process. The field is not needed when data frames are transmitted subsequently. In the MAC layer, the delay caused by the additional information exchange is also a concern. Given the reasoning above, we determine the antenna/beam selection sequentially in the two stations: first in the station that will receive data frames, and then in the receiver transmitting the data frames.

The long sequence of training frames 200 are transmitted from the station B 110 to the station A 120 for complete channel estimation. Antennas/beams at the station A are selected based on the estimated complete channel matrix $\hat{H}_{A \to B}$ using the long sequence of training frames.

The short sequence of training frames 300 are transmitted from the station A to the station B for estimating a partial channel matrix corresponding to the number of selected antennas/beams at the station A. Antennas/beams to be used at the station B are determined based on the estimated partial channel matrix.

Note that transmission of any data frames subsequently is independent of the selected channel submatrix. A straightforward solution is to use a fixed channel submatrix for all stations. For example, by transmitting a complete channel training frame from the station B to the station A, the estimated complete channel matrix is $$\hat{H}_{A \to B} = \begin{bmatrix} 1 & 0 & 0 & 0 \\ 0 & 1 & 0 & 0 \\ 0 & 0 & 0.9 & 0 \\ 0 & 0 & 0 & 0.9 \end{bmatrix},$$

and the selected transmit/receive antennas determined at the station A are {1,2} and {1,2}, respectively.

By sending the short sequence of training frames using the selected transmit antennas 1 and 2 at station A, the estimated partial channel matrix is $$\hat{H}'_{A \to B} = \begin{bmatrix} 1 & 0 \\ 0 & 1 \\ 0 & 0 \\ 0 & 0 \end{bmatrix},$$

and the selected antennas at station B are 1 and 2. The equivalent channel matrix becomes $$H''_{eq} = \begin{bmatrix} 1 & 0 \\ 0 & 1 \end{bmatrix}.$$

Structure of Training Frames

Due to the limitations on the number of available RF chains for data modulation and demodulation, the training frames are organized in an alternating manner, in where only a subset of antennas are used concurrently for signal transmission and reception.

FIG. 2 shows an example of the long sequence of training frames 300 for a MIMO system where both station A and station B operate according to a "two-out-of-four" antenna selection policy. The long sequence of training frames includes training frames transmitted by each of the transmit antennas 201-204 of the station B 110, and received by each corresponding antenna of station A.

In FIG. 2, TF represents each training frame for channel estimation in a 2×2 MIMO system. Thus, for each of the training frames of the long sequence sent from the station B to station A, during each of the time intervals $T_1$, $T_2$, $T_3$, and $T_4$, a 2×2 submatrix of the channel is estimated, and the first two rows of $H_{A \to B}$, corresponding to antennas 1 and 2 at the station B, are estimated during $T_1$ and $T_2$. From $T_1$ to $T_2$, the inputs of the two RF chains available at station A, which is now the receiver of the training frame, are switched from antennas {1,2} to {3,4}. From $T_2$ to $T_3$, the outputs of the two RF chains available at station B, which is now the transmitter of the training frame, are switched from antennas {1,2} to {3,4}. Antennas 1 and 2 are selected at station A.

As shown in FIG. 3, for the short sequence of training frames sent from station A to station B, only the first two columns of $H_{A \to B}$, corresponding to antennas 1 and 2 (301-302) at the station A are estimated. The antenna/beam selection at station B is determined based on this partial channel matrix. Note that the transmission of data frame also uses the selected antennas/beams.

Due to the transition time needed for switches to settle to a stable output, some additional protection interval is inserted between consecutive training frames. This additional interval can be taken into account in the guard interval in OFDM systems when the transition period plus the maximum delay spread of the channel is less than the guard interval.

For the case when only one station has antenna/beam selection capability, the training scheme simplifies to a one-step process that only includes antenna/beam selection at station B.

Other Embodiments

The method described above can also be applied to the cases where the system is frequency-selective, such as an OFDM systems designed according to the IEEE 802.11n standard, because antenna selection and RF-band processing can be implemented independent of frequency. The RF-baseband processing has the advantage that the performance gain is independent of frequency-selectivity, while the gain by antenna selection tends to be averaged out by frequency-selectivity.

In OFDM systems, it is also possible to frequency-interleave training frames, so that different tones of training frames are transmitted simultaneously from several transmit antennas, Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

What is claimed is:

1. A method for transmitting training frames in a multiple-input multiple-output (MIMO) system from a station B to a station A via a channel of the MIMO system, in which the station A includes $N_A$ antennas and $N_{A\_SS}$ RF modulator chains and the station B includes $N_B$ antennas and $N_{B\_SS}$ RF modulator chains, comprising:

determining a first lower bound $$\lfloor N_B \cdot N_A / N_{A\_SS} \rfloor;$$

transmitting, from a station B to a station A, a long sequence of training frames for antenna selection, in which a number of frames in the long sequence of training frames is at least equal to the first lower bound;

determining a second lower bound $$\lfloor N_{A\_SS} \cdot N_B / N_{B\_SS} \rfloor;$$

transmitting, in response to receiving the long sequence of training frames, from the station A to the station B, a short sequence of training frames for antenna selection, in which a number of frames in the short training sequence is at least equal to the second lower bound;

estimating, for antenna selection in the station A, complete characteristics of the channel from the long sequence of training frames; and estimating, for antenna selection in the station B, partial characteristics of the channel from the short sequence of training frames; and selecting, in the station A, a subset of the $N_A$ antennas according to the complete channel characteristics; and selecting, in the station B, a subset of the $N_B$ antennas according to the partial channel characteristics.

2. The method of claim 1, further comprising:

selecting, in the station A, a subset of available beams according to the complete channel characteristics to transmit the short sequence of training frames.

3. The method of claim 1, further comprising:

receiving, in the station B, data frames from the station A using the selected subset of the $N_B$ antennas.

4. The method of claim 1, further comprising:

selecting, in the station B, a subset of available beams according to the partial characteristics of the channel to receive data frames from the station A.

5. The method of claim 1, in which the MIMO system is frequency selective.

6. The method of claim 1, in which the MIMO system uses orthogonal frequency division multiplexing.

7. The method of claim 1, further comprising:

communicating the number of antennas in the station A and the number of RF modulator chains in the station B between the station A and the station B using a media access layer of the MIMO system.

8. The method of claim 1, further comprising:

communicating the number of antennas in the station A and the number of RF modulator chains in the station B between the station A and the station B in a preamble of a physical layer of the MIMO system.

9. The method of claim 1, in which the number of antennas in the station A and the number of RF chains is predetermined.

10. The method of claim 1, in which the long sequence of training frames are transmitted in response to receiving a request for full training from the station A in the station B.

* * * * *